(12) United States Patent
Sikora (10) Patent No.: US 11,776,389 B2
(45) Date of Patent: Oct. 3, 2023

(54) INTER-VEHICLE OPTICAL NETWORK

(71) Applicant: Tomar Electronics, Inc., Gilbert, AZ (US)

(72) Inventor: Scott T. Sikora, Gilbert, AZ (US)

(73) Assignee: Tomar Electronics, Inc., Gilbert, AZ (US)

( * ) Notice: Subject to any disclaimer, the term of this patent is extended or adjusted under 35 U.S.C. 154(b) by 0 days.

(21) Appl. No.: 17/576,812

(22) Filed: Jan. 14, 2022

(65) Prior Publication Data

US 2022/0230534 A1 Jul. 21, 2022

Related U.S. Application Data

(60) Provisional application No. 63/139,133, filed on Jan. 19, 2021.

(51) Int. Cl.
*G08C 23/04* (2006.01)
*G08G 1/087* (2006.01)
*G08G 1/16* (2006.01)

(52) U.S. Cl.
CPC ............. *G08C 23/04* (2013.01); *G08G 1/087* (2013.01); *G08G 1/161* (2013.01)

(58) Field of Classification Search
CPC ......... G08C 23/04; G08G 1/087; G08G 1/161
See application file for complete search history.

(56) References Cited

U.S. PATENT DOCUMENTS

| 5,172,113 | A | 12/1992 | Hamer |
|---|---|---|---|
| 5,187,373 | A | 2/1993 | Gregori |
| 5,187,476 | A | 2/1993 | Hamer |
| 5,202,683 | A | 4/1993 | Hamer et al. |
| 5,539,398 | A | 7/1996 | Hall et al. |
| 5,602,739 | A | 2/1997 | Haagenstad et al. |
| 5,955,968 | A | 9/1999 | Bentrott et al. |
| 6,326,903 | B1 | 12/2001 | Gross et al. |
| 6,888,474 | B2 | 5/2005 | Sharp et al. |
| 7,042,345 | B2 | 5/2006 | Ellis |

(Continued)

FOREIGN PATENT DOCUMENTS

EP 0531045 3/1993

OTHER PUBLICATIONS

Kamalanathsharma. Traffic Adaptive Offset-Based Preemption for Emergency Vehicles. 2010 http://filebox.vt.edu/users/rkishore/pdf/thesis2010.pdf.

*Primary Examiner* — Mohamed Barakat
(74) *Attorney, Agent, or Firm* — BOOTH UDALL FULLER, PLC; Kenneth C. Booth (57) ABSTRACT

An inter-vehicle optical network a plurality of lights, a plurality of optical sensors arranged around the perimeter of the vehicle configured to gather light data regarding a light intensity and gradient of incoming light, a controller communicatively coupled with the plurality of lights and the plurality of optical sensors. The controller configured to receive the light data from the plurality of optical sensors, detect in the light data a second flashing light pattern emitted by an adjacent vehicle with a rhythm, a color, and/or a light intensity, adjust the light level of each light of the plurality of lights based on the light data, adjust the first flashing light pattern in response to the second flashing light pattern, and adjust the first flashing light pattern to synchronize the first flashing light pattern with the second flashing light pattern.

17 Claims, 6 Drawing Sheets

(56) References Cited

U.S. PATENT DOCUMENTS

| | | |
|---|---|---|
| 7,248,183 B2 | 7/2007 | Pfleging et al. |
| 7,307,547 B2 | 12/2007 | Schwartz |
| 7,333,028 B2 | 2/2008 | Schwartz |
| 7,573,399 B2 | 8/2009 | Schwartz |
| 7,952,491 B2 | 5/2011 | Schwartz et al. |
| 8,031,062 B2 | 10/2011 | Smith |
| 8,054,202 B1 | 11/2011 | Sikora et al. |
| 8,072,346 B2 | 12/2011 | Hall et al. |
| 11,422,229 B2 * | 8/2022 | Fix .................. B60W 50/14 |
| 2006/0273923 A1 | 12/2006 | Schwartz |
| 2008/0094249 A1 | 4/2008 | Pappas |
| 2011/0084853 A1 | 4/2011 | Johnson |
| 2011/0084854 A1 | 4/2011 | Johnson |
| 2011/0109477 A1 | 5/2011 | Edwardson et al. |
| 2011/0169661 A1 | 7/2011 | Eichhorst |
| 2011/0193722 A1 | 8/2011 | Johnson |
| 2011/0234423 A1 | 9/2011 | Edwardson |
| 2011/0304476 A1 | 12/2011 | Johnson et al. |
| 2014/0125498 A1 | 5/2014 | Curry |
| 2018/0295704 A1 * | 10/2018 | Haverlag ............... H05B 47/12 |
| 2021/0046862 A1 * | 2/2021 | Wang ..................... G06T 7/593 |
| 2021/0078487 A1 * | 3/2021 | Bader ..................... B60Q 1/52 |
| 2021/0156536 A1 * | 5/2021 | Adams ................. G01J 1/0242 |
| 2021/0229594 A1 * | 7/2021 | Roychowdhury ..... H05B 45/12 |

\* cited by examiner

FIG. 6

INTER-VEHICLE OPTICAL NETWORK

CROSS REFERENCE TO RELATED APPLICATIONS

This application claims the benefit of the filing date of U.S. Provisional Patent Application 63/139,133 entitled "INTER-VEHICLE OPTICAL NETWORK" to Scott T. Sikora that was filed on Jan. 19, 2021, the disclosure of which is hereby incorporated herein by this reference.

TECHNICAL FIELD

Aspects of this document relate generally to emergency and service vehicle lights, and more specifically to variable lighting configured to coordinate with the lighting of adjacent vehicles.

BACKGROUND

Emergency and service personnel must often park their vehicles in locations that obstruct or come close to paths taken by other vehicles. For example, an emergency vehicle may be parked in a normal lane of traffic in order to prevent other vehicles from traveling in that lane. Thus, an immediate concern for the safety of all emergency and service vehicles and their drivers and passengers is that other drivers notice the emergency or service vehicle. To that end, emergency and service vehicles are often equipped with lights. These lights are designed to attract the attention of people near the vehicle. However, changing environments make it difficult to consistently emit light at a level that is appropriate. For example, a fire engine that is deployed at nighttime does not need as bright of lights to be noticed as it would in the middle of a bright day. Similarly, an ambulance parked in a lane of traffic could partially be in the sun or in the shade. The lights in the shade would not require the same level of brightness as the lights in the sun.

SUMMARY

Aspects of this document relate to an inter-vehicle optical network that may comprise a plurality of lights arranged around a perimeter of a vehicle and configured to flash in a first flashing light pattern and illuminate the surroundings of the vehicle, wherein each light of the plurality of lights has an individually adjustable light level, a plurality of optical sensors arranged around the perimeter of the vehicle, wherein each individual optical sensor of the plurality of optical sensors is configured to gather light data regarding a light intensity and gradient of incoming light within a field of vision of the individual optical sensor, a controller mounted to the vehicle and communicatively coupled with the plurality of lights and the plurality of optical sensors, wherein the controller is configured to receive the light data from the plurality of optical sensors, detect in the light data a second flashing light pattern emitted by an adjacent vehicle, wherein the second flashing light pattern comprises at least one of a rhythm, at least one color, and at least one light intensity, detect in the light data a brightness level of ambient light surrounding the individual optical sensor, adjust the light level of each light of the plurality of lights based on the light data, adjust the first flashing light pattern in response to the second flashing light pattern, and adjust the first flashing light pattern to synchronize the first flashing light pattern with the second flashing light pattern.

Particular embodiments may comprise one or more of the following features. The light data may comprise characteristics of the incoming light including a light frequency, a color, and a pulse pattern. The controller may further be configured to detect a change in the brightness level of the ambient light surrounding each individual optical sensor and adjust the light level of each light of the plurality of lights based on the change in the brightness level of the ambient light. The vehicle may comprise a preemption system configured to control traffic signals in the path of the vehicle and the controller is further configured to adjust a length of time for which the traffic signals are affected based on information communicated to the controller through the second flashing light pattern. The perimeter of the vehicle may be divided into a plurality of zones, wherein a portion of the plurality of optical sensors and a portion of the plurality of lights are associated with a first zone of the plurality of zones, and wherein the portion of the plurality of lights associated with the first zone of the plurality of zones is controlled by the controller based on the light data gathered by the portion of the plurality of optical sensors associated with the first zone of the plurality of zones.

Aspects of this document also relate to an inter-vehicle optical network that may comprise a plurality of lights mounted on a vehicle, wherein each light of the plurality of lights has an individually adjustable light level, a plurality of optical sensors mounted on the vehicle, wherein each individual optical sensor of the plurality of optical sensors is configured to gather light data regarding incoming light within a field of vision of the individual optical sensor, a controller mounted to the vehicle and communicatively coupled with the plurality of lights and the plurality of optical sensors, wherein the controller is configured to receive the light data from the plurality of optical sensors, detect in the light data a second flashing light pattern emitted by an adjacent vehicle, wherein the second flashing light pattern comprises at least one of a rhythm, at least one color, and at least one light intensity, detect in the light data a brightness level of ambient light surrounding the individual optical sensor, and adjust the first flashing light pattern and the light level of each light of the plurality of lights based on the light data.

Particular embodiments may comprise one or more of the following features. The plurality of lights and the plurality of optical sensors may each be arranged around a perimeter of the vehicle. The controller may further be configured to adjust the first flashing light pattern to synchronize the first flashing light pattern with the second flashing light pattern. The light data may comprise characteristics of the incoming light including a light frequency, a color, and a pulse pattern. The controller may further be configured to detect a change in the brightness level of the ambient light surrounding each individual optical sensor and adjust the light level of each light of the plurality of lights based on the change in the brightness level of the ambient light.

Aspects of this document also relate to an inter-vehicle optical network that may comprise at least one light mounted on a vehicle, wherein each light of the at least one light has an adjustable light level, at least one optical sensor mounted on the vehicle, wherein each individual optical sensor of the at least one optical sensor is configured to gather light data regarding incoming light within a field of vision of the individual optical sensor, a controller mounted to the vehicle and communicatively coupled with the at least one light and the at least one optical sensor, wherein the controller is configured to receive the light data from the at least one optical sensor, and adjust the first flashing light pattern and the light level of each light of the at least one light based on the light data.

Particular embodiments may comprise one or more of the following features. The controller may be further configured to detect in the light data a second flashing light pattern emitted by an adjacent vehicle, wherein the second flashing light pattern comprises at least one of a rhythm, at least one color, and at least one light intensity. The controller may further be configured to adjust the first flashing light pattern in response to the second flashing light pattern. The vehicle may comprise a preemption system configured to control traffic signals in the path of the vehicle and the controller is further configured to adjust a length of time for which the traffic signals are affected based on information communicated to the controller through the second flashing light pattern. The controller may further be configured to adjust the first flashing light pattern to synchronize the first flashing light pattern with the second flashing light pattern. The controller may further be configured to detect in the light data a brightness level of ambient light surrounding the individual optical sensor. The light data may comprise characteristics of the incoming light including a light frequency, a color, and a pulse pattern. The controller may further be configured to detect a change in the brightness level of the ambient light surrounding each individual optical sensor and adjust the light level of each light of the plurality of lights based on the change in the brightness level of the ambient light. Each optical sensor of the plurality of optical sensors may correspond with at least one light of the plurality of lights. The plurality of lights and the plurality of optical sensors may each be arranged around a perimeter of the vehicle.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 120(f). Thus, the use of the words "function," "means" or "step" in the Detailed Description or Description of the Drawings or claims is not intended to somehow indicate a desire to invoke the special provisions of 35 U.S.C. § 120(f), to define the invention. To the contrary, if the provisions of 35 U.S.C. § 120(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 120(f). Moreover, even if the provisions of 35 U.S.C. § 120(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to an inter-vehicle optical network 100. The inter-vehicle optical network 100 is configured to enable communication between multiple vehicles, such as a first vehicle 10 and a second vehicle 20, through the lighting system of each vehicle 10. This may enhance the effectiveness of vehicle convoys or clusters, where a convoy involves vehicles that are moving together, while a cluster involves a group of stationary vehicles. Additionally, the inter-vehicle optical network 100 is configured to allow a vehicle 10 to adapt to changing lighting situations and increase safety by providing sufficient lighting without over-illuminating the surroundings of the vehicle 10.

Figure 1:
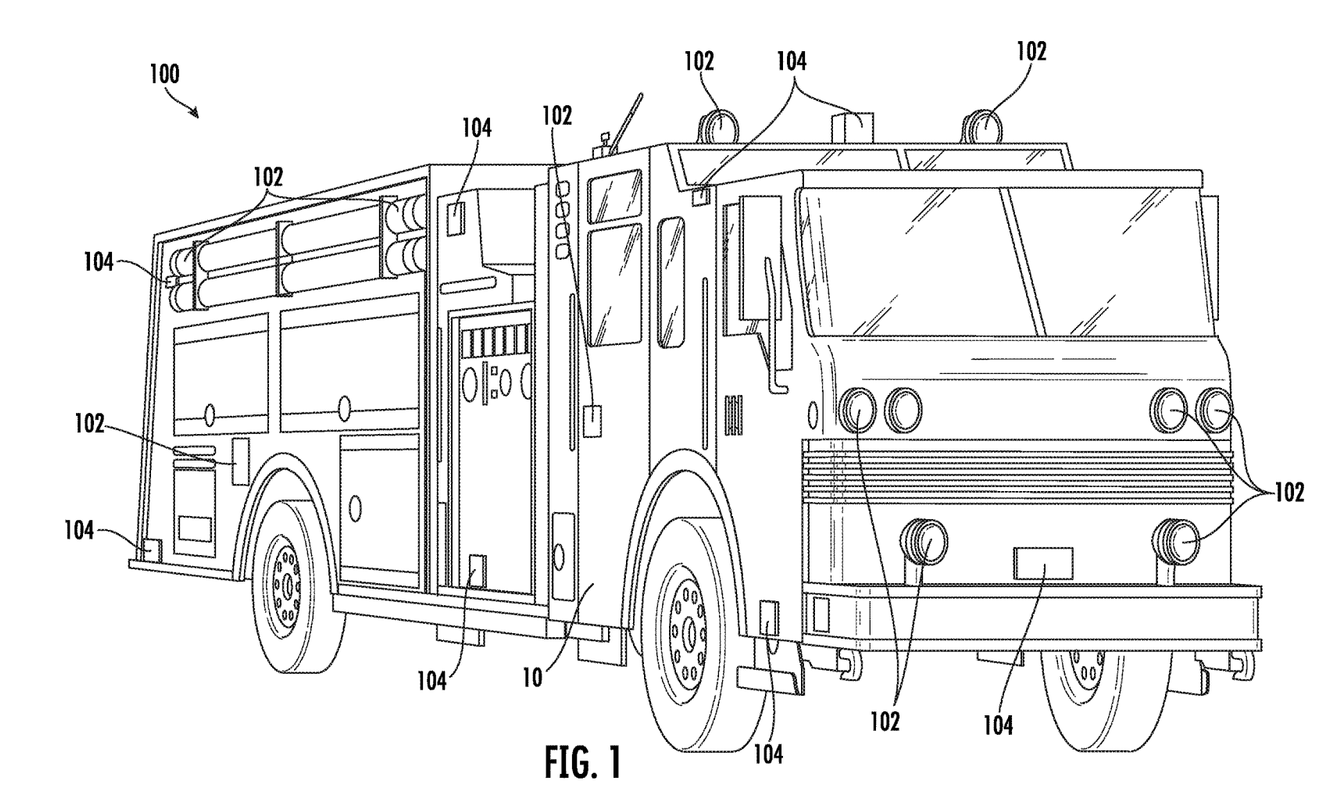
FIG. 1 is a perspective view of an inter-vehicle optical network installed on a vehicle.
Figure 2:
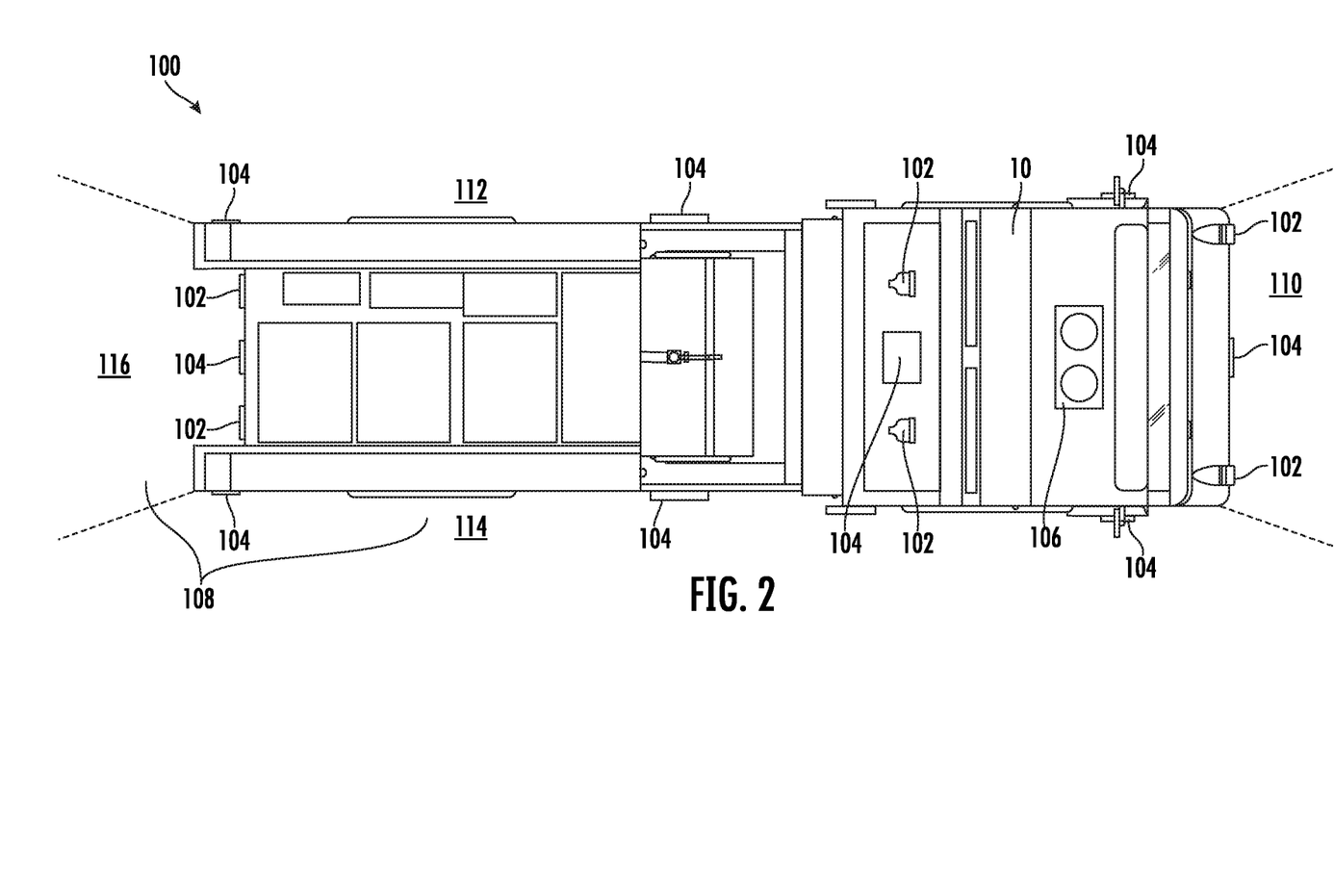
FIG. 2 is a top view of the inter-vehicle optical network shown in FIG. 1.
Figure 3:
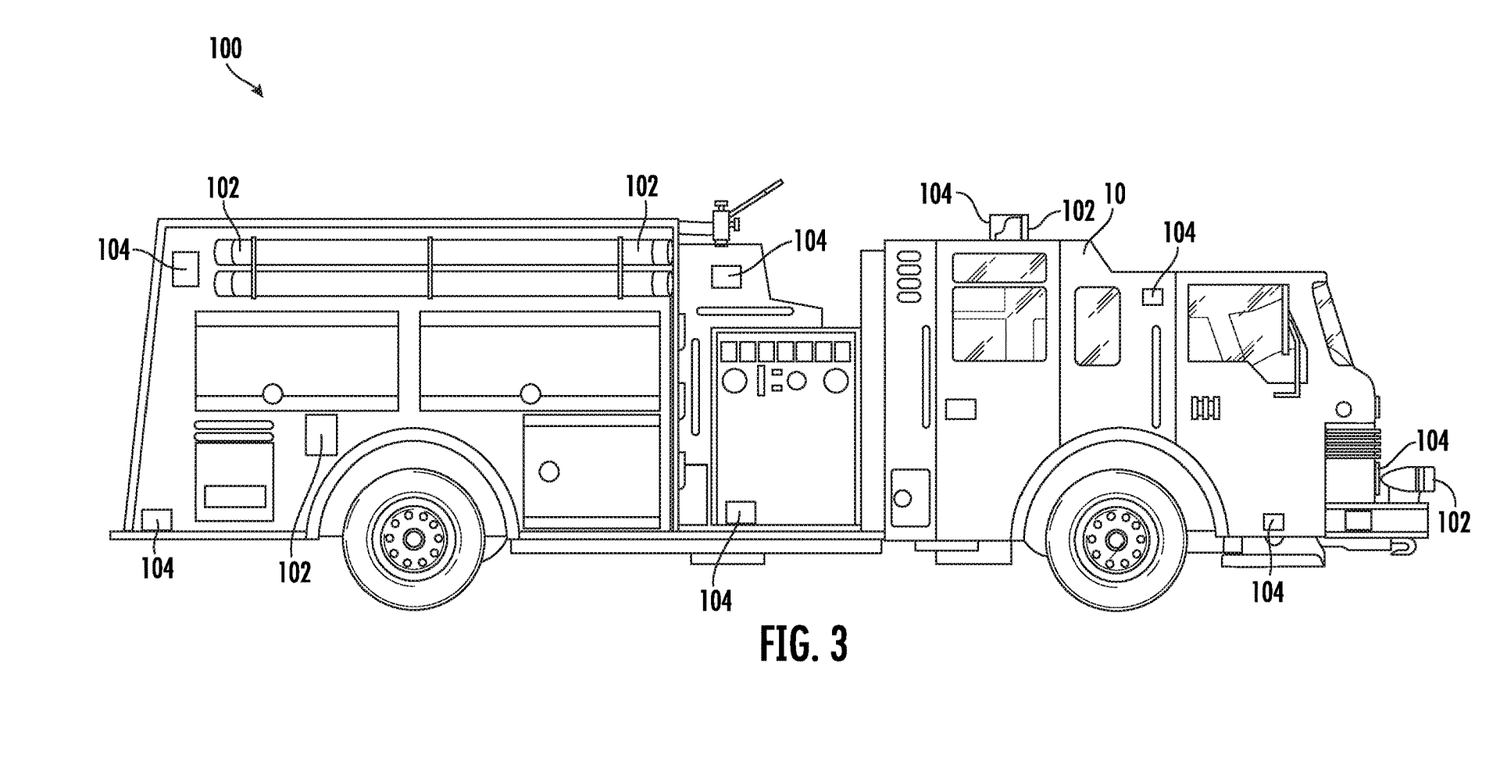
FIG. 3 is a side view of the inter-vehicle optical network shown in FIG. 1.

The inter-vehicle optical network 100 comprises a circuit with at least one light 102, at least one optical sensor 104, and a controller 106. The light 102 is mounted on the vehicle 10. The inter-vehicle optical network 100 may comprise a plurality lights 102, as shown in FIGS. 1-3. The plurality of lights 102 may be arranged around a perimeter of the vehicle 10, as shown in FIG. 2. The lights 102 may be configured to flash in a first flashing light pattern. The first flashing light pattern may be used to communicate information or data to an adjacent vehicle 20 that is similarly equipped with an inter-vehicle optical network 100. The lights 102 may also be configured to illuminate the surroundings of the vehicle 10. Each light 102 may have an individually adjustable light level. In some embodiments, the lights 102 may be grouped together, with the light levels of each light 102 being adjustable by group.

The optical sensors 104 are also mounted to the vehicle 10. Each optical sensor 104 is configured to gather light data regarding incoming light within a field of vision of that specific optical sensor 104. The optical sensors 104 may be configured to measure the ambient light level in direction up to 360 degrees around the vehicle 10. The light data may comprise a light intensity and a gradient of incoming light. For example, the light data may indicate how the light intensity varies across the field of vision of the optical sensor 104. The light data may also comprise characteristics of the incoming light. For example, the light data may include a light frequency, a color, and a pulse pattern. The light data may comprise visible light, infrared light, ultraviolet light, or any combination of the three. Other characteristics of the incoming light that could be used to communicate information may also be included in the light data, whether that data communicated on a spectrum visible to humans or includes modulations of the light signal not visable to humans. In some embodiments, the light 102 and the optical sensor 104 are incorporated into a single device that comprises both a light 102 and an optical sensor 104. The optical sensors 104 may also be integrated with other electrical devices, such as LED lightheads or other fixtures of emergency or service vehicles 10. The inter-vehicle optical network 100 may have an optical sensor 104 for every light 102. Each optical sensor 104 may be located with its corresponding light 102. Alternatively, the optical sensors 104 and the lights 102 may be physically separated. The inter-vehicle optical network 100 may comprise a plurality of optical sensors 104, as shown in FIGS. 1-3. The plurality of optical sensors 104 may be arranged around a perimeter of the vehicle 10, as shown in FIG. 2. This allows the inter-vehicle optical network 100 to gather light data from all sides of the vehicle 10. In some embodiments, the inter-vehicle optical network 100 may have a single optical sensor 104 positioned on top of the vehicle 100.

The optical sensors 104 may be configured to gather light data from all directions. In some embodiments, the optical sensors 104 are configured to gather data from less than 360 degrees. As shown in FIG. 2, the perimeter of the vehicle 10 may be divided into a plurality of zones 108. In some embodiments, the plurality of zones may comprise a first zone 110, a second zone 112, a third zone 114, and a fourth zone 116. A different portion of the plurality of lights 102 may be associated with each of the plurality of zones 108. Thus, the inter-vehicle optical network 100 may control each light 102 based on which zone 108 it is located in and based on the light data gathered by the optical sensors 104 associated with that particular zone 108. The optical sensors 104 may be configured to gather data regarding the incoming light in a portion of the zones without gathering light data in all of the zones. For example, the optical sensors 104 may be configured to only gather light data from the rear and two sides of the vehicle 10, which correspond with the second zone 112, the third zone 114, and the fourth zone 116 for the embodiment shown in FIG. 2. Thus, in some embodiments, particular zones 108 may have lights 102 that emit with variable light levels, while other zones 108 may have lights 102 with fixed light levels.

The optical sensors 104 are configured to receive and measure light from all light sources surrounding the vehicle 10. For example, the optical sensors 104 may be configured to measure ambient light levels, as well as receive and recognize light from the lighting systems of other vehicles, such as a second vehicle 20 and a third vehicle 30, and light emitted from certain programming or control devices. Thus, the optical sensors 104 may be configured to measure not only the ambient light 118, but also specific light frequencies, colors, pulse patterns, and any other characteristics of light. This allows the inter-vehicle optical network 100 to both respond to changing ambient light levels as well as recognize and respond to the lighting systems of adjacent vehicles 10.

Figure 4:
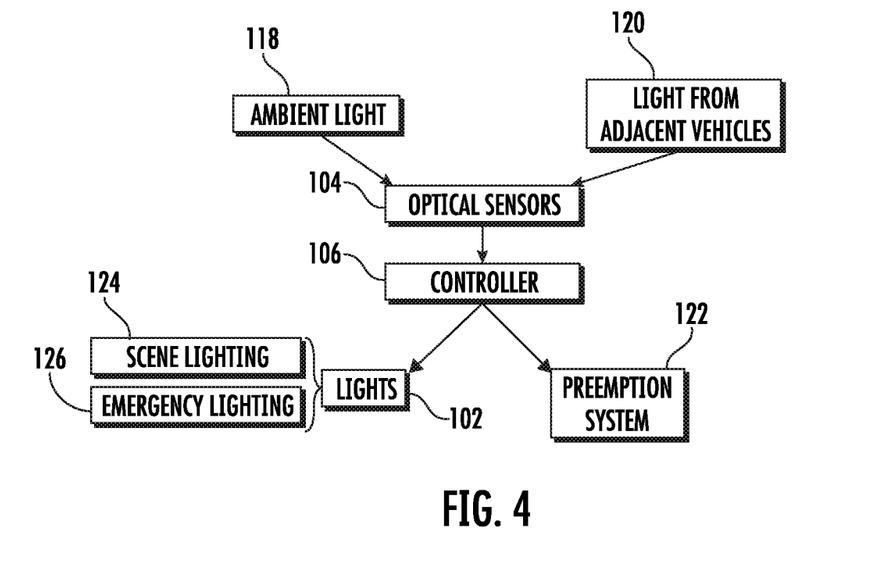
FIG. 4 is a network diagram for the inter-vehicle optical network shown in FIG. 1.

The controller 106 may also be mounted to the vehicle 10. The controller 106 is communicatively coupled with the lights 102 and the optical sensors 104, thus allowing the controller 106 to receive data from the optical sensors 104 and then control the lights 102 in response to the data received from the optical sensors 104. In other words, the controller 106 may be configured to interpret the light data and pass instructions to other components based on the light data. During initial system install, the controller 106 may receive programming to enable the controller 106 to detect different flashing patterns comprising different rhythms, colors, and modes. The controller 106 may then be configured to change the vehicle's emergency lighting, internal illumination, scene illumination, and other warning system functions based on the flashing patterns detected. For example, as shown in FIG. 4, the inter-vehicle optical network 100 may function as follows. The light surrounding the vehicle 10 may include both ambient light 118 and light from adjacent vehicles 120. The optical sensors 104 are configured to receive this incoming light and communicate the light data received to the controller 106. The controller 106 is configured to process the light data and may use the light data to control the lights 102 and/or a preemption system 122 installed in the vehicle 10. The lights 102 may be used for scene lighting 124, with the goal being to illuminate the surroundings of the vehicle 10, and/or for emergency lighting 126, with the goal being to attract attention to the vehicle 10 and/or communicate with an adjacent vehicle 20.

Figure 5:
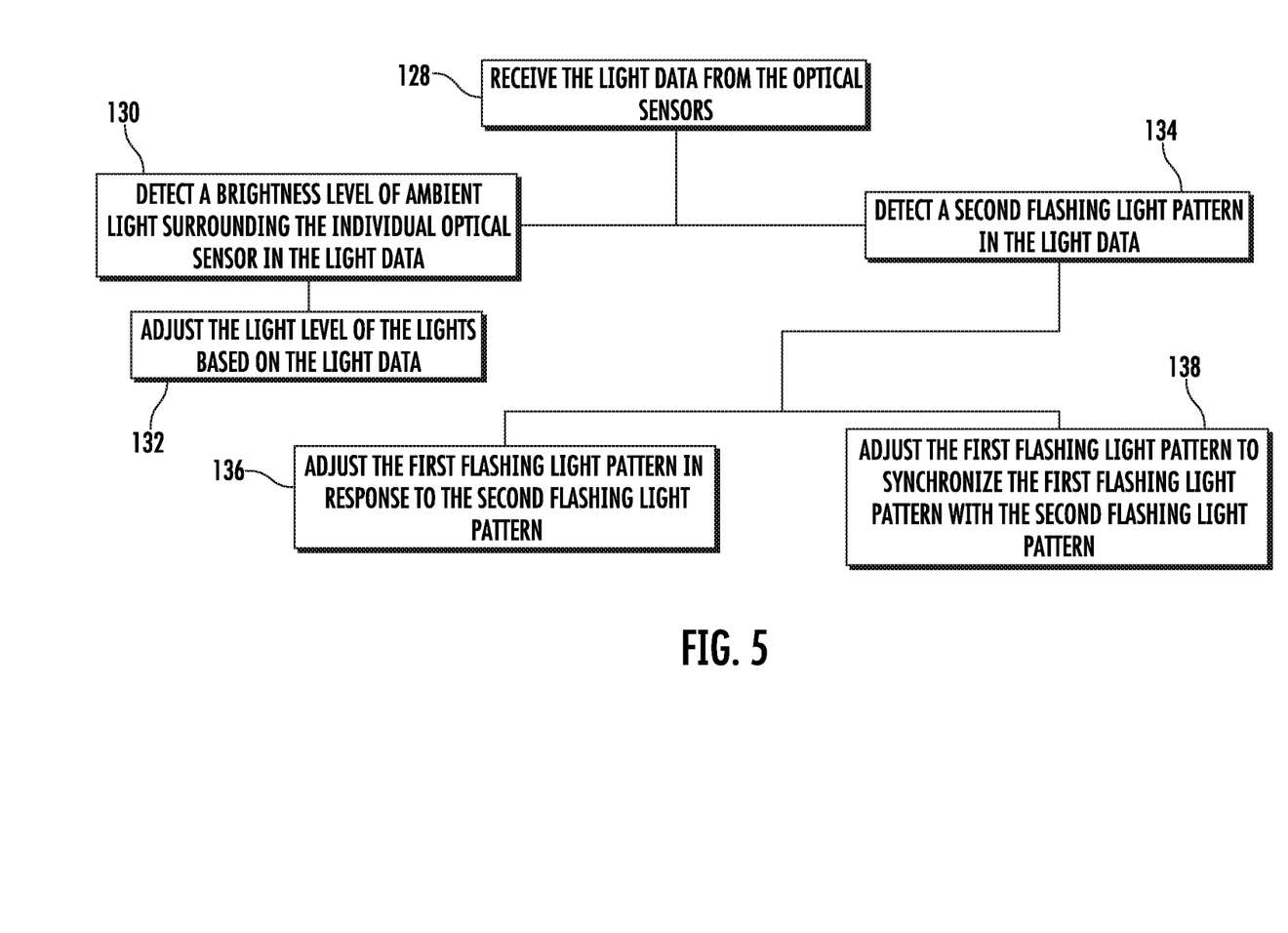
FIG. 5 is a process diagram showing actions which may be taken by the controller of the inter-vehicle optical network shown in FIG. 1.

To that end, as illustrated in FIG. 5, the controller may be configured to receive the light data from the optical sensors 128. The controller may then detect in the light data a brightness level of ambient light surrounding the individual optical sensor 130. Once the brightness level of ambient light 118 is known, the controller can adjust the light level of the lights based on the light data 132. This allows scenes to be illuminated enough that an emergency responder can clearly see the surroundings without providing so much light that vision is inhibited. The controller 106 may also detect in the light data a second flashing light pattern 134. The second flashing light pattern may be emitted by an adjacent vehicle 20 to communicate information to the vehicle 10 (see FIG. 6). The first flashing light pattern and the second flashing light pattern may each comprise at least one of a rhythm, at least one color, and at least one light intensity. By varying each of these characteristics, different data and information can be communicated through the flashing light patterns by assigning different meanings to different rhythms, colors, and light intensities. The controller 106 may be configured to adjust the first flashing light pattern in response to the second flashing light pattern 136. In this way, information and data can be shared between multiple controllers 106 and whichever controller 106 is in charge can adjust to the situation, having a more complete picture of the situation.

Figure 6:
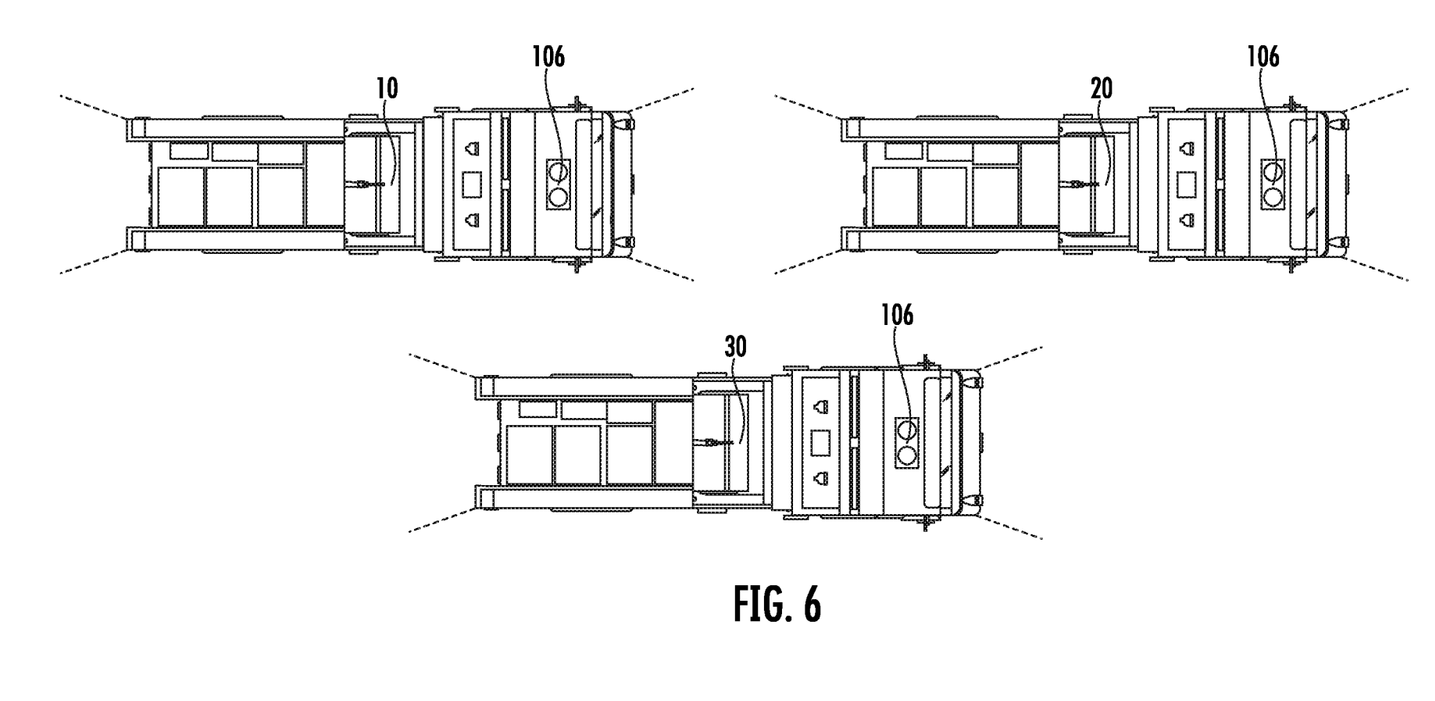
FIG. 6 is a top view of a cluster of vehicles joined together by the inter-vehicle optical network.

Because the optical sensors 104 are configured to receive light from all light sources, the vehicle's lighting system may also be controlled with any device that emits optical signals. Multiple vehicles may even be controlled using the same device. Thus, in situations where there are multiple emergency or service vehicles, such as a first vehicle 10, a second vehicle 20, and a third vehicle 30, as shown in FIG. 6, the single device, or even the emissions from a single vehicle, can be used to coordinate the lighting systems of all of the vehicles to meet the lighting needs of the situation either simultaneously, in sequence, or through a chain of light commands passed between the first vehicle 10, the second vehicle 20, and the third vehicle 30 automatically. The third vehicle 30 may be used to flash emergency lights, while the first vehicle 10 and the second vehicle 20 may be used to illuminate the scene. Alternatively, no single device may be used to control all of the vehicles 10, but instead, each vehicle 10 includes its own controller 106 and may use its own optical sensors 104 to observe what adjacent vehicles 20, 30 are doing, and then the controller 106 for that vehicle may turn certain lights 102 on or off based on the need and its programming. For example, the first vehicle 10 may already be illuminating the scene. When the second vehicle 20 pulls up next to the first vehicle 10, the second vehicle 20, through its optical sensors 104 and controller 106 may recognize that the side of the second vehicle 20 closer to the first vehicle 10 is already illuminated, and thus not turn on the scene illumination lights 102 on that side of the second vehicle 20. However, the second vehicle 20 may also recognize that, on the side of the second vehicle 20 facing away from the first vehicle 10, the second vehicle 20 is now blocking the light from the first vehicle 10. Thus, the second vehicle 20 may automatically turn on the scene illumination lights 102 on the side of the second vehicle 20 facing away from the first vehicle 10 in response to input from the optical sensors 104 and in response to a command from the controller 106 of the first vehicle 10. Each vehicle 10, 20, 30 may also lower the brightness of the lights 102 as more lights are turned on. In this manner, all of the scene continues to be illuminated with a desired illumination level without having excessive lighting in the center of the group of vehicles 10. This preserves energy and maintains a proper lighting level for the scene regardless of the number of vehicles at the scene.

In some scenarios, the first flashing light pattern and the second flashing light pattern are not used to communicate any information, but rather are used to ensure that third parties nearby become aware of the presence of the vehicles 10. In such a scenario, the controller 106 is configured to adjust the first flashing light pattern to synchronize the first flashing light pattern with the second flashing light pattern 138. This allows each of the vehicles to have flashing lights, ensuring that third parties are aware of the vehicle's presence, without overly contributing to the chaos of the situation. For example, when three or four emergency vehicles are parked near each other, all flashing lights differently, this can be disorienting to individuals present, or to drivers passing by. With the flashing lights synchronized, through the respective optical sensors 104 and controllers 106 of the various vehicles 10, the disorientation may be lessened, improving the safety of emergency responders, pedestrians, and drivers.

The various controllers 106 of the inter-vehicle optical network 100, which are all installed on different vehicles, are configured to communicate via the lights 102. This can be done with the color and flash rate of the lights 102. This communication can also take place by embedding information within the flashing light patterns used by adding additional lighting components. The additional lighting components could be visible light that is emitted in addition to the normal lighting or could be an additional infrared emitted component.

The controller 106 may also be configured to detect a change in the brightness level of the ambient light 118 surrounding each individual optical sensor 104. A respective controller 106 may adjust the light level of each light 102 of the plurality of lights 102 on the vehicle 10 based on the change detected in the brightness level of the ambient light 118. This allows the inter-vehicle optical network 100 to adjust to changing environmental light levels automatically. For example, when the sun is shining, brighter lights may be needed for the flashing emergency lights to be visible, but when the sky is cloudy, the lights 102 may not need to be illuminated so brightly. Further, during the night, the lights 102 can be even dimmer. Thus, the inter-vehicle optical network 100 can adjust to different ambient light levels. In some scenarios, different lights 102 located in different positions around the vehicle 10 may adjust to different light levels based on the ambient light 118 surrounding each individual optical sensor 104. For example, the vehicle 10 may be parked with a portion of the vehicle 10 in the shade and a portion of the vehicle 10 in the sun. The plurality of optical sensors 104 and the plurality of lights 102 may be controlled to adjust accordingly so that each individual light 102 is set to an optimal light intensity.

As mentioned above, the inter-vehicle optical network 100 may interface with a preemption system 122 installed on the vehicle 10. The preemption system 122 allows the vehicle 10 to communicate with light signals and other traffic control systems in the path of the vehicle 10 so that traffic is cleared ahead of the vehicle 10, allowing the vehicle 10 to travel faster to the destination of the vehicle 10, and so that the vehicle 10 does not need to stop at traffic lights. In some situations, multiple vehicles 10 are traveling to the same destination. In such a situation, the inter-vehicle optical network 100 of the vehicles 10 behind the first vehicle 10 may communicate with the inter-vehicle optical network 100 of the first vehicle 10 so that the first vehicle 10 knows how many vehicles 10 are following, and how far back they are. The controller 106 may be configured to adjust a length of time for which the traffic signals are affected based on the communications sent by the following vehicles 10 through the second flashing light pattern. This allows all of the vehicles 10 to travel safely to the destination in the shortest amount of time possible.

It will be understood that implementations of an inter-vehicle optical network are not limited to the specific assemblies, devices and components disclosed in this document, as virtually any assemblies, devices and components consistent with the intended operation of an inter-vehicle optical network may be used. Accordingly, for example, although particular inter-vehicle optical networks, and other assemblies, devices and components are disclosed, such may include any shape, size, style, type, model, version, class, measurement, concentration, material, weight, quantity, and/or the like consistent with the intended operation of inter-vehicle optical networks. Implementations are not limited to uses of any specific assemblies, devices and components; provided that the assemblies, devices and components selected are consistent with the intended operation of an inter-vehicle optical network.

Accordingly, the components defining any inter-vehicle optical network may be formed of any of many different types of materials or combinations thereof that can readily be formed into shaped objects provided that the materials selected are consistent with the intended operation of an inter-vehicle optical network. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1180 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various inter-vehicle optical networks may be manufactured using conventional procedures as added to and improved upon through the procedures described here. Some components defining an inter-vehicle optical network may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling inter-vehicle optical networks are not limited to the specific order of steps as disclosed in this document. Any steps or sequence of steps of the assembly of an inter-vehicle optical network indicated herein are given as examples of possible steps or sequence of steps and not as limitations, since various assembly processes and sequences of steps may be used to assemble inter-vehicle optical networks.

The implementations of an inter-vehicle optical network described are by way of example or explanation and not by way of limitation. Rather, any description relating to the foregoing is for the exemplary purposes of this disclosure, and implementations may also be used with similar results for a variety of other applications employing an inter-vehicle optical network.

What is claimed is:
1. An inter-vehicle optical network comprising:
a plurality of lights arranged around a perimeter of a vehicle and configured to flash in a first flashing light pattern and illuminate the surroundings of the vehicle, wherein each light of the plurality of lights has an individually adjustable light level;
a plurality of optical sensors arranged around the perimeter of the vehicle, wherein each individual optical sensor of the plurality of optical sensors is configured to gather light data regarding a light intensity and gradient of incoming light within a field of vision of the individual optical sensor;

a controller mounted to the vehicle and communicatively coupled with the plurality of lights and the plurality of optical sensors;

wherein the controller is configured to:
receive the light data from the plurality of optical sensors;
detect in the light data a second flashing light pattern emitted by an adjacent vehicle, wherein the second flashing light pattern comprises at least one of a rhythm, at least one color, and at least one light intensity;
detect in the light data a brightness level of ambient light surrounding the individual optical sensor;
adjust the light level of each light of the plurality of lights based on the light data;
adjust the first flashing light pattern in response to the second flashing light pattern;
adjust the first flashing light pattern to synchronize the first flashing light pattern with the second flashing light pattern; and
adjust a length of time for which the traffic signals are affected by a vehicle traffic signal preemption system based on information communicated to the controller through the second flashing light pattern.

2. The inter-vehicle optical network of claim 1, wherein the light data comprises characteristics of the incoming light including a light frequency, a color, and a pulse pattern.

3. The inter-vehicle optical network of claim 1, wherein the controller is further configured to detect a change in the brightness level of the ambient light surrounding each individual optical sensor and adjust the light level of each light of the plurality of lights based on the change in the brightness level of the ambient light.

4. The inter-vehicle optical network of claim 1, wherein the perimeter of the vehicle is divided into a plurality of zones, wherein a portion of the plurality of optical sensors and a portion of the plurality of lights are associated with a first zone of the plurality of zones, and wherein the portion of the plurality of lights associated with the first zone of the plurality of zones is controlled by the controller based on the light data gathered by the portion of the plurality of optical sensors associated with the first zone of the plurality of zones.

5. An inter-vehicle optical network comprising:
a plurality of lights mounted on a vehicle, wherein each light of the plurality of lights has an individually adjustable light level and a first flashing light pattern;
a plurality of optical sensors mounted on the vehicle, wherein each individual optical sensor of the plurality of optical sensors is configured to gather light data regarding incoming light within a field of vision of the individual optical sensor;
a controller mounted to the vehicle and communicatively coupled with the plurality of lights and the plurality of optical sensors;
wherein the controller is configured to:
receive the light data from the plurality of optical sensors;
detect in the light data a second flashing light pattern emitted by an adjacent vehicle, wherein the second flashing light pattern comprises at least one of a rhythm, at least one color, and at least one light intensity;
detect in the light data a brightness level of ambient light surrounding the individual optical sensor; and
adjust the first flashing light pattern and the light level of each light of the plurality of lights based on the light data; and
adjust a length of time for which the traffic signals are affected by a vehicle traffic signal preemption system based on information communicated to the controller through the second flashing light pattern.

6. The inter-vehicle optical network of claim 5, wherein the plurality of lights and the plurality of optical sensors are each arranged around a perimeter of the vehicle.

7. The inter-vehicle optical network of claim 5, wherein the controller is further configured to adjust the first flashing light pattern to synchronize the first flashing light pattern with the second flashing light pattern.

8. The inter-vehicle optical network of claim 5, wherein the light data comprises characteristics of the incoming light including a light frequency, a color, and a pulse pattern.

9. The inter-vehicle optical network of claim 5, wherein the controller is further configured to detect a change in the brightness level of the ambient light surrounding each individual optical sensor and adjust the light level of each light of the plurality of lights based on the change in the brightness level of the ambient light.

10. An inter-vehicle optical network comprising:
at least one light mounted on a vehicle, wherein each light of the at least one light has an adjustable light level and a first flashing light pattern;
at least one optical sensor mounted on the vehicle, wherein each individual optical sensor of the at least one optical sensor is configured to gather light data regarding incoming light within a field of vision of the individual optical sensor;
a controller mounted to the vehicle and communicatively coupled with the at least one light and the at least one optical sensor;
wherein the controller is configured to:
receive the light data from the at least one optical sensor; and
adjust the first flashing light pattern and the light level of each light of the at least one light based on the light data;
detect in the light data a second flashing light pattern emitted by an adjacent vehicle, wherein the second flashing light pattern comprises at least one of a rhythm, at least one color, and at least one light intensity; and
adjust a length of time for which the traffic signals are affected by a vehicle traffic signal preemption system based on information communicated to the controller through the second flashing light pattern.

11. The inter-vehicle optical network of claim 10, wherein the controller is further configured to adjust the first flashing light pattern in response to the second flashing light pattern.

12. The inter-vehicle optical network of claim 10, wherein the controller is further configured to adjust the first flashing light pattern to synchronize the first flashing light pattern with the second flashing light pattern.

13. The inter-vehicle optical network of claim 10, wherein the controller is further configured to detect in the light data a brightness level of ambient light surrounding the individual optical sensor.

14. The inter-vehicle optical network of claim 10, wherein the light data comprises characteristics of the incoming light including a light frequency, a color, and a pulse pattern.

15. The inter-vehicle optical network of claim 10, wherein the controller is further configured to detect a change in the brightness level of the ambient light surrounding each individual optical sensor and adjust the light level of each light of the plurality of lights based on the change in the brightness level of the ambient light.

16. The inter-vehicle optical network of claim 10, wherein each optical sensor of the plurality of optical sensors corresponds with at least one light of the plurality of lights.

17. The inter-vehicle optical network of claim 10, wherein the plurality of lights and the plurality of optical sensors are each arranged around a perimeter of the vehicle.

* * * * *